(No Model.)

A. M. WHITE.
WHEEL FOR VELOCIPEDES.

No. 317,956. Patented May 12, 1885.

WITNESSES.
E. P. J. Morton
Homer H. Fiske

INVENTOR.
Albert M. White
By Charles E. Pratt
Atty

UNITED STATES PATENT OFFICE.

ALBERT M. WHITE, OF WATERBURY, ASSIGNOR TO THE POPE MANUFACTURING COMPANY, OF HARTFORD, CONNECTICUT.

WHEEL FOR VELOCIPEDES.

SPECIFICATION forming part of Letters Patent No. 317,956, dated May 12, 1885.

Application filed February 2, 1885. (No model.)

*To all whom it may concern:*

Be it known that I, ALBERT M. WHITE, of Waterbury, Connecticut, have invented certain new and useful Improvements in Wheels for Velocipedes and other Vehicles, of which the following is a specification.

My improvements relate to that part of the wheel called the "rim" or "felly," and more particularly to that class of wheels known as "suspension-wheels," and to that class of fellies known as "tubular" or "hollow" fellies, and are made in the nature of improvements upon the devices shown in my previous patent, No. 310,857, dated January 13, 1885, although they may be equally applicable to other forms of wheels or rims, or to wheels for other purposes.

The object of my improvements is to strengthen the rim and the wheel in which it is combined, not only in the direction of the line of draw or support of the spokes, but also, and more especially, to strengthen the rim and the wheel in a direction transverse to the other and against "buckling," and to strengthen it in the most effective way with the least possible use of metal or additional weight; and the nature of these improvements will be apparent from the following description, taken in connection with the drawings, in which—

Figure 1:
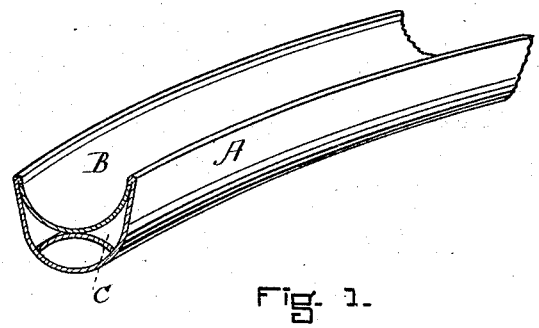
Figure 2:
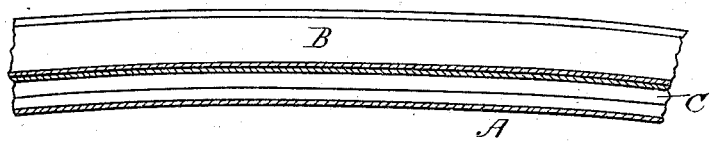

Figure 1 shows in cross-section and half-perspective a portion of a wheel rim or felly embodying my improvements in one form, and Fig. 2 shows the same in a vertical section on a plane at right angles to the plane of the section in Fig. 1.

A is the inner convex spoke-receiving side of a metallic wheel-rim. B is the outer concave or tire side of the felly, and C is a transverse brace or re-enforce, consisting in a strip of sheet metal cut to a width proportioned to the breadth of the felly in which it is to be placed, formed convex on a curve preferably corresponding to that of the part B, and extending preferably through the whole circumference of the felly between the two parts A and B, taking a bearing at its edges on either side of the part A, and bearing at its middle part on the inner side of the part B.

The parts A and B as I construct them, and as shown in the drawings, are separate pieces of metal joined near their edges at or on the tire side of the felly; but the felly may be constructed in any other desirable manner.

The part C may be made, as I prefer to make it, in one continuous strip throughout the felly; or it may be in sections or separate parts.

The spokes may be inserted in any desired form, so as to draw or hold against either the convex side of the part A, or, passing through the part A, may draw upon the part B and the brace C, which latter is the manner in which I prefer to join them, and which gives, obviously, greater strength to the wheel; and as these and other modifications may be made in form and proportions without departing from the substance of my invention I do not limit myself to the precise forms shown and herein described.

I am aware that hollow fellies have heretofore been constructed with two thicknesses of metal at certain parts, and also with short braces or struts at the interstices for spokes; and also that such rims have been shown and patented as made in two external pieces of sheet metal and an internal piece curved so as to rest against each of the external pieces, but so curved and placed as to rest against them with corresponding and contiguous curves; hence I do not claim, broadly, a re-enforce in a hollow wheel-rim; but I am not aware that any rim before my invention has been made or shown or described having a narrow strip of sheet metal inserted with reverse curves between the tire side and the hub side, so as to form a brace or arch to brace apart the lateral sides of the felly as well as the tire and hub side, by what I call a "three-line contact;" and this latter is the chief feature of my invention, enabling me to gain the greatest strength against buckling, and the best support for the tire side with the least amount of metal possible.

I claim as new and of my invention—

In a hollow metallic felly, a re-enforce, C, curved longitudinally to correspond with the curvature of the felly, and curved transversely and placed and combined in a felly so that its convex surface is contiguous to the inner convex surface of the tire side of the felly and its edges raised against the inner surface of the lateral side of the felly, essentially as set forth.

ALBERT M. WHITE.

Witnesses:
   A. J. WELLES,
   E. S. HOUSE.